(12) United States Patent
Yokota

(10) Patent No.: US 11,286,198 B2
(45) Date of Patent: Mar. 29, 2022

(54) LAS SYSTEM CRYSTALLINE GLASS, LAS SYSTEM CRYSTALLIZED GLASS, METHOD FOR PRODUCING LAS SYSTEM CRYSTALLINE GLASS, AND METHOD FOR PRODUCING LAS SYSTEM CRYSTALLIZED GLASS

(71) Applicant: NIPPON ELECTRIC GLASS CO., LTD., Otsu (JP)

(72) Inventor: Yuki Yokota, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 85 days.

(21) Appl. No.: 16/628,694

(22) PCT Filed: Aug. 31, 2018

(86) PCT No.: PCT/JP2018/032374
§ 371 (c)(1),
(2) Date: Jan. 6, 2020

(87) PCT Pub. No.: WO2019/049785
PCT Pub. Date: Mar. 14, 2019

(65) Prior Publication Data
US 2020/0181002 A1    Jun. 11, 2020

(30) Foreign Application Priority Data

Sep. 5, 2017  (JP) .............................. JP2017-170349

(51) Int. Cl.
*C03C 10/00* (2006.01)

(52) U.S. Cl.
CPC ...... *C03C 10/0027* (2013.01); *C03C 2203/10* (2013.01); *C03C 2204/00* (2013.01)

(58) Field of Classification Search
CPC .......................... C03C 10/0027; C03C 3/083
See application file for complete search history.

(56) References Cited

U.S. PATENT DOCUMENTS

| 3,676,204 | A | * | 7/1972 | Eppler | .................... C04B 33/00 |
| | | | | | 428/427 |
| 3,951,670 | A | * | 4/1976 | Bush | ................... C03C 10/0027 |
| | | | | | 501/7 |
| 4,126,476 | A | * | 11/1978 | Grossman | ........... C03C 10/0027 |
| | | | | | 501/4 |
| 5,387,558 | A | | 2/1995 | Grossman | |
| 9,079,794 | B2 | * | 7/2015 | Horsley | .................... C03C 4/02 |
| 2004/0186000 | A1 | * | 9/2004 | Kawamoto | ............. C03C 1/004 |
| | | | | | 501/66 |
| 2011/0071011 | A1 | | 3/2011 | Fujisawa et al. | |
| 2011/0160033 | A1 | | 6/2011 | Yamauchi et al. | |
| 2011/0263410 | A1 | | 10/2011 | Negishi et al. | |
| 2013/0130887 | A1 | | 5/2013 | Nakane et al. | |
| 2014/0135201 | A1 | | 5/2014 | Chauvel-Melscoet et al. | |
| 2015/0266773 | A1 | * | 9/2015 | Ogawa | .................... C30B 29/18 |
| | | | | | 501/32 |
| 2016/0340237 | A1 | | 11/2016 | Fecher et al. | |
| 2017/0203998 | A1 | | 7/2017 | Comte et al. | |

FOREIGN PATENT DOCUMENTS

| CN | 101665324 A | 3/2010 | |
| CN | 104350017 A | 2/2015 | |
| CN | 104379525 A | 2/2015 | |
| DE | 10 2015 108 173 A1 | 11/2016 | |
| EP | 3018107 A1 * | 5/2016 | ............ C03C 3/097 |
| JP | 39-21049 B | 9/1964 | |
| JP | 40-20182 B | 9/1965 | |
| JP | 01-308845 A | 12/1989 | |
| JP | 07-215733 A | 8/1995 | |
| JP | 11-228180 A | 8/1999 | |
| JP | 11-228181 A | 8/1999 | |
| JP | 2001-348250 A | 12/2001 | |
| JP | 2004-269347 A | 9/2004 | |
| JP | 2013-249221 A | 12/2013 | |
| JP | 2016-005995 A | 1/2016 | |
| WO | 02/094595 A2 | 11/2002 | |
| WO | 2010/053214 A1 | 5/2010 | |
| WO | 2013/179894 A1 | 12/2013 | |

OTHER PUBLICATIONS

Official Communication issued in corresponding European Patent Application No. 18852822.8, dated Apr. 28, 2021.
Official Communication issued in International Patent Application No. PCT/JP2018/032374, dated Nov. 13, 2018.
Official Communication issued in corresponding Chinese Patent Application No. 201880057584.2, dated Oct. 15, 2021.

* cited by examiner

*Primary Examiner* — Noah S Wiese
(74) *Attorney, Agent, or Firm* — Keating and Bennett, LLP

(57) ABSTRACT

An object of the present invention is to provide a less tinted LAS system crystallized glass. In the present invention, a content of each of V and Cr in the LAS system crystallized glass is 0 to 3 ppm and a content of each of Sc, La, Ce, Pr, Pm, Sm, Eu, Gd, Tb, Dy, Ho, Er, Tm, Yb, Lu, Ac, Th, Pa, and U is 0 to 10 ppm.

13 Claims, No Drawings

LAS SYSTEM CRYSTALLINE GLASS, LAS SYSTEM CRYSTALLIZED GLASS, METHOD FOR PRODUCING LAS SYSTEM CRYSTALLINE GLASS, AND METHOD FOR PRODUCING LAS SYSTEM CRYSTALLIZED GLASS

TECHNICAL FIELD

The present invention relates to LAS-based crystallizable glasses, LAS-based crystallized glasses, methods for producing LAS-based crystallizable glasses, and methods for producing LAS-based crystallized glasses. Particularly, the present invention relates to: a LAS-based crystallizable glass and a LAS-based crystallized glass each suitable as a material for front windows of oil stoves, wood stoves and the like, substrates for high-technology products, such as color filter substrates and image sensor substrates, industrial scales, setters for firing electronic components, electromagnetic cooker top plates, fire door windows, and so on; a method for producing the LAS-based crystallizable glass; and a method for producing the LAS-based crystallized glass.

BACKGROUND ART

As examples of a LAS-based crystallized glass, Patent Literatures 1 to 3 disclose LAS-based crystallized glasses in which $Li_2O$—$Al_2O_3$—$SiO_2$ system crystals, such as a β-quartz solid solution ($Li_2O.Al_2O_3.nSiO_2$ [where $2 \leq n \leq 4$]) or a β-spodumene solid solution ($Li_2O.Al_2O_3.nSiO_2$ [where $n \geq 4$]), are precipitated as a main crystal phase.

LAS-based crystallized glasses have low coefficients of thermal expansion and high mechanical strength and therefore have excellent thermal properties. Furthermore, by appropriately controlling the heat treatment condition in a crystallization step, the type of crystals to be precipitated in a LAS-based crystallized glass can be controlled and, thus, not only a white crystallized glass but also a transparent crystallized glass (with a β-quartz solid solution precipitated therein) can be produced.

In producing this type of crystallized glass, it is necessary to melt a glass batch at high temperatures above 1400° C. Therefore, as a fining agent to be added to the glass batch, $As_2O_3$ or $Sb_2O_3$ is used which is capable of producing a large amount of fining gas during melting at high temperatures. However, $As_2O_3$ and $Sb_2O_3$ are highly toxic and therefore may contaminate the environment during the production process of glass and during treatment of waste glass.

To cope with this, $SnO_2$ or Cl has been proposed as an alternative fining agent to $As_2O_3$ or $Sb_2O_3$ (see, for example, Patent Literatures 4 and 5). However, Cl easily corrodes a mold and metallic rolls during glass forming and, as a result, may degrade the surface quality of the glass. From this viewpoint, it is preferred to use as a fining agent $SnO_2$, which does not cause the above problem.

However, when $SnO_2$ is used as a fining agent, the crystallized glass is more deeply tinted owing to $TiO_2$, $Fe_2O_3$ or so on than when $As_2O_3$ or $Sb_2O_3$ used before is used. Thus, the crystallized glass takes on a more yellowish tint, which presents a problem of unfavorable appearance.

In order to remedy the tinting of a crystallized glass involved in the incorporation of $SnO_2$, the content of $TiO_2$ may be reduced. However, a reduction in the content of $TiO_2$ narrows the optimal firing temperature range and is likely to reduce the amount of crystal nuclei produced. As a result, the amount of coarse crystals is increased, so that the crystallized glass is likely to be cloudy and have impaired transparency. Furthermore, if a shortage in the production of crystal nuclei due to a reduced content of $TiO_2$ is made up for by an increase in the content of $ZrO_2$, the amount of crystal nuclei produced is increased, but coarse crystals concurrently precipitate, also in which case the crystallized glass is likely to be cloudy and have impaired transparency. For the above reasons, in the case of obtaining a LAS-based crystallized glass in which $SnO_2$ is used as a fining agent, particularly obtaining a transparent crystallized glass, it is extremely difficult to reduce yellowish tinting.

Patent Literature 6 proposes a technique for reducing yellowish tinting due to $SnO_2$ and $V_2O_5$, but the reduction is insufficient. Patent Literature 7 proposes to reduce yellowish tinting of a LAS-based crystallized glass using a complementary color effect of $Cr_2O_3$. However, the decolorization using the complementary color effect reduces the brightness of a product and makes a dull impression on the product as a whole.

CITATION LIST

Patent Literature

[PTL 1]
JP-B-S39-21049
[PTL 2]
JP-B-S40-20182
[PTL 3]
JP-A-H01-308845
[PTL 4]
JP-A-H11-228180
[PTL 5]
JP-A-H11-228181
[PTL 6]
JP-A-2013-249221
[PTL 7]
JP-A-2016-5995

SUMMARY OF INVENTION

Technical Problem

As thus far described, the conventional methods sacrifice transparency, brightness or other various properties in order to reduce tinting. No definitive resolution thereof has yet been achieved. In addition, recently, it has been demanded to further reduce the tinting of a LAS-based crystallized glass.

In view of the above, an object of the present invention is to provide a less tinted LAS-based crystallized glass.

Solution to Problem

The inventor thought that the tinting of LAS-based crystallized glasses was not only attributed to the above-mentioned transition metals but also could be increased by rare earth elements or actinoid elements contained in the crystallized glasses, and examined the effects of the individual rare earth elements and actinoid elements on tinting.

Results of the inventor's examination showed that although Y was a rare earth element, it had only a limited effect on the tinting of the glass. Furthermore, it was shown that Nd could be expected to provide a complementary color effect against yellowish tinting. On the other hand, it was found that the other rare earth elements and actinoid elements had significant effects on the tinting of the glass.

LAS-based crystalline glasses before being crystallized, i.e., LAS-based crystallizable glasses denote the same tendency of the above phenomena for the LAS-based crystallized glasses.

Note that in the present invention the rare earth elements refer to 17 elements composed of Sc, Y, and lanthanoids (La, Ce, Pr, Nd, Pm, Sm, Eu, Gd, Tb, Dy, Ho, Er, Tm, Yb, and Lu), and the actinoid elements refer to four elements composed of Ac, Th, Pa, and U.

Specifically, in a LAS-based crystallizable glass according to the present invention, a content of each of V and Cr in the glass is 0 to 3 ppm and a content of each of Sc, La, Ce, Pr, Pm, Sm, Eu, Gd, Tb, Dy, Ho, Er, Tm, Yb, Lu, Ac, Th, Pa, and U is 0 to 10 ppm.

Thus, a less tinted LAS-based crystallizable glass can be obtained. To be more specific, not only tinting of the glass due to transition metals, such as V and Cr, can be reduced, but also tinting of the glass due to the rare earth elements and actinoid elements can be reduced. As a result, a LAS-based crystallizable glass having a high degree of whiteness or a high degree of transparency can be obtained.

In a LAS-based crystallized glass according to the present invention, a content of each of V and Cr in the glass is 0 to 3 ppm and a content of each of Sc, La, Ce, Pr, Pm, Sm, Eu, Gd, Tb, Dy, Ho, Er, Tm, Yb, Lu, Ac, Th, Pa, and U is 0 to 10 ppm.

Because the LAS-based crystallized glass according to the present invention is made by crystallizing the less tinted LAS-based crystallizable glass described above, not only tinting of the glass due to transition metals, such as V and Cr, can be reduced, but also tinting of the glass due to the rare earth elements and actinoid elements can be reduced. As a result, a LAS-based crystallized glass having a high degree of whiteness or a high degree of transparency can be obtained.

Furthermore, in the LAS-based crystallized glass according to the present invention, a content of Y in the glass is preferably 0.05 to 200 ppm.

Y is a component less contributing to the color tone of the LAS-based crystallized glass. Therefore, in view of production costs and effort, Y is allowed to be contained, to a certain extent, in the crystallized glass without hindering the color tone of the glass.

The LAS-based crystallized glass according to the present invention preferably contains as a glass composition, in terms of % by mass, 55 to 75% $SiO_2$, 5 to 25% $Al_2O_3$, 2 to 5% $Li_2O$, 0 to 1% $Na_2O$, 0 to 1% $K_2O$, 0 to 3% MgO, 0 to 2% BaO, 0.5 to 3% $TiO_2$, 0.1 to 5% $ZrO_2$, 3 to 5% $TiO_2+ZrO_2$, 0 to 3% $P_2O_5$, and 0 to 1% $SnO_2$.

By doing so, a β-quartz solid solution or a β-spodumene solid solution is easily precipitated as a main crystal phase, so that a low expansion and high mechanical strength LAS-based crystallized glass can be easily obtained. In addition, by controlling the crystallization condition, the type of crystals to be precipitated in the LAS-based crystallized glass can be controlled and, thus, a transparent crystallized glass with a β-quartz solid solution precipitated therein can be easily produced.

In the LAS-based crystallized glass according to the present invention, a b* value in a L*a*b* representation in a CIE standard is preferably 2.86 or less. The b* value is, in a range of b*>0, an index indicating the degree of yellow tinting of glass and a higher b* value means that the glass has a more yellowish tint. On the other hand, in a range of b*<0, the b* value is an index indicating the degree of blue tinting of glass and a higher b* value on the negative side means that the glass has a more bluish tint.

Thus, a less tinted LAS-based crystallized glass can be easily obtained.

In the LAS-based crystallized glass according to the present invention, a β-quartz solid solution is preferably precipitated as a main crystal phase.

Thus, a transparent, low coefficient of thermal expansion LAS-based crystallized glass can be easily obtained.

In the LAS-based crystallized glass according to the present invention wherein a β-quartz solid solution is precipitated as a main crystal phase, a coefficient of thermal expansion at 30 to 380° C. is preferably $-20 \times 10^{-7}/°$ C. to $20 \times 10^{-7}/°$ C. In this case, the coefficient of thermal expansion means an average coefficient of linear thermal expansion at 30 to 380° C.

Thus, the LAS-based crystallized glass can be suitably used for various purposes requiring transparency and low expansivity.

In the LAS-based crystallized glass according to the present invention, a β-spodumene solid solution is preferably precipitated as a main crystal phase.

Thus, a LAS-based crystallized glass having a high degree of whiteness can be easily obtained.

In the LAS-based crystallized glass according to the present invention wherein a β-spodumene solid solution is precipitated as a main crystal phase, a coefficient of thermal expansion at 30 to 380° C. is preferably $-20 \times 10^{-7}/°$ C. to $20 \times 10^{-7}/°$ C.

Thus, the LAS-based crystallized glass can be suitably used for various purposes requiring high whiteness and low expansivity.

A method for producing a LAS-based crystallizable glass according to the present invention is a method for producing a LAS-based crystallizable glass, including the steps of preparing a batch of raw materials, melting the batch, and forming the melt batch into shape, wherein selection of the raw materials and management of the steps are made so that a content of each of V and Cr in the obtained crystallizable glass is 0 to 3 ppm and a content of each of Sc, La, Ce, Pr, Pm, Sm, Eu, Gd, Tb, Dy, Ho, Er, Tm, Yb, Lu, Ac, Th, Pa, and U in the obtained crystallizable glass is 0 to 10 ppm.

A method for producing a LAS-based crystallized glass according to the present invention is a method for producing a LAS-based crystallized glass, including the steps of preparing a batch of raw materials, melting the batch, forming the melt batch into shape to produce a LAS-based crystallizable glass, and then subjecting the LAS-based crystallizable glass to heat treatment to crystallize the LAS-based crystallizable glass, wherein selection of the raw materials and management of the steps are made so that a content of each of V and Cr in the obtained crystallized glass is 0 to 3 ppm and a content of each of Sc, La, Ce, Pr, Pm, Sm, Eu, Gd, Tb, Dy, Ho, Er, Tm, Yb, Lu, Ac, Th, Pa, and U in the obtained crystallized glass is 0 to 10 ppm.

In the method for producing a LAS-based crystallized glass according to the present invention, a content of Y in the crystallized glass is preferably 0.05 to 200 ppm.

In the method for producing a LAS-based crystallized glass according to the present invention, the batch of raw materials is preferably prepared to provide a crystallizable glass containing as a glass composition, in terms of % by mass, 55 to 75% $SiO_2$, 5 to 25% $Al_2O_3$, 2 to 5% $Li_2O$, 0 to 1% $Na_2O$, 0 to 1% $K_2O$, 0 to 3% MgO, 0 to 2% BaO, 0.5 to 3% $TiO_2$, 0.1 to 5% $ZrO_2$, 3 to 5% $TiO_2+ZrO_2$, 0 to 3% $P_2O_5$, and 0 to 1% $SnO_2$.

In the method for producing a LAS-based crystallized glass according to the present invention, a color tone of transmitted light through a thickness of 3 mm of the obtained LAS-based crystallized glass preferably has a b* value of 2.86 or less in a L*a*b* color system of a CIE standard.

Thus, a less tinted LAS-based crystallized glass having excellent transparency or whiteness can be easily obtained.

The method for producing a LAS-based crystallized glass according to the present invention preferably uses, as a glass raw material, a Zr raw material in which a content of each of V, Cr, Sc, La, Ce, Pr, Pm, Sm, Eu, Gd, Tb, Dy, Ho, Er, Tm, Yb, Lu, Ac, Th, Pa, and U is 500 ppm or less.

In the method for producing a LAS-based crystallized glass according to the present invention, a Zr raw material is not a material to be used in large amounts. However, the Zr raw material contains a high proportion of V, Cr, rare earth elements, and actinoid elements and is thus highly likely to have an effect on tinting of the glass. Therefore, by appropriately using, among glass raw materials, particularly a Zr raw material, a less tinted LAS-based crystallized glass having excellent transparency or whiteness can be easily obtained.

In the method for producing a LAS-based crystallized glass according to the present invention, $ZrO_2$ is preferably used as the Zr raw material.

By doing so, the incorporation of V, Cr, rare earth elements, and actinoid elements into the obtained glass can be significantly reduced, so that a less tinted LAS-based crystallized glass having excellent transparency or whiteness can be easily obtained.

Advantageous Effects of Invention

The LAS-based crystallized glass according to the present invention is less tinted and has excellent transparency or whiteness. Furthermore, with the use of the method for producing a LAS-based crystallized glass according to the present invention, a less tinted LAS-based crystallized glass having excellent transparency or whiteness can be easily obtained.

DESCRIPTION OF EMBODIMENTS

Hereinafter, a description will be given of a LAS-based crystallized glass according to the present invention. In the following description, unless otherwise stated, "%" refers to "% by mass" and ppm refers to ppm (by mass).

In the LAS-based crystallized glass according to the present invention, the content of each of V and Cr in the crystallized glass is 0 to 3 ppm, preferably 0.1 to 2.5 ppm, and particularly preferably 0.5 to 2 ppm. Thus, a less tinted LAS-based crystallized glass having excellent transparency or whiteness can be easily obtained.

In the LAS-based crystallized glass according to the present invention, the content of each of the rare earth elements and actinoid elements is preferably 0 to 10 ppm, 0 to 7 ppm, 0 to 5 ppm, 0 to 3 ppm, 0 to 2 ppm, or particularly preferably 0 to 1 ppm. Thus, a less tinted LAS-based crystallized glass having excellent transparency or whiteness can be easily obtained.

When each of the above transition metals, rare earth elements, and actinoid elements is irradiated with light having energy corresponding to visible light, an electronic transition occurs in the d orbital or f orbital which are frontier electronic orbitals of the element, so that the glass may be tinted. In addition, tinting may also occur owing to a CT transition in which electrons transfer from anions, such as oxygen atoms or sulfur atoms, near each element involved in tinting to the frontier orbitals of the element.

However, the rare earth elements and actinoid elements are elements present in the earth crust and are likely to be inevitably contained in glass raw materials and eventually in a produced glass. Therefore, a reduction of the content of these elements in the crystallized glass beyond necessity should preferably be avoided as much as possible in view of cost and effort.

The inventor examined the effects of the rare earth elements and actinoid elements on tinting. As a result, the inventor found that some of these 21 elements were likely to contribute to tinting of LAS-based crystallized glasses and others were less likely to contribute to the tinting.

In view of the above finding, as for, among the rare earth elements and actinoid elements, the elements less likely to contribute to the color tone of the LAS-based crystallized glass, each of these elements may be contained in an amount of 0.05 ppm or more, 0.1 ppm or more, or particularly 0.2 ppm or more in the crystallized glass. Alternatively, these elements may be positively incorporated to a certain extent in the crystallized glass.

For example, Y is a component less likely to contribute to the color tone than the other elements. Therefore, without the need to reduce the content of Y in the crystallized glass to the limit, a LAS-based crystallized glass having a desired color tone can be obtained.

Furthermore, Y is the fourth most abundant rare earth element in the earth crust and is highly likely to be present in a larger amount in the crystallized glass than other rare earth elements. Therefore, particularly in view of production costs and effort, Y may be contained, to a certain extent, in the crystallized glass without hindering the color tone of the glass.

Specifically, in the LAS-based crystallized glass according to the present invention, the content of Y in the crystallized glass may be over 0 to 200 ppm, 0.01 to 180 ppm, 0.02 to 150 ppm, 0.03 to 100 ppm, 0.04 to 50 ppm, 0.05 to 10 ppm, 0.1 to 9 ppm, or particularly 0.2 to 8 ppm. Furthermore, the content of Y in the crystallized glass is preferably 0.05 to 110 ppm or more.

Alternatively, in the LAS-based crystallized glass according to the present invention, the content of Y in the crystallized glass may be not less than 0.1 ppm, not less than 0.5 ppm, not less than 1 ppm, not less than 5 ppm, not less than 10 ppm, not less than 20 ppm, not less than 30 ppm, not less than 50 ppm, not less than 80 ppm, not less than 100 ppm, or not less than 130 ppm.

Thus, production costs and effort can be saved, which is favorable.

Nd has the effect of reducing the yellowish tint of the LAS-based crystallized glass. Although an excessive amount of Nd may impair the transparency or whiteness, Nd may be positively contained, to a certain extent, in the glass without impairing the gist of the invention.

Specifically, in the LAS-based crystallized glass according to the present invention, the content of Nd in the glass may be over 0 to 300 ppm, 0.01 to 270 ppm, 0.02 to 250 ppm, 0.1 to 200 ppm, 0.1 to 150 ppm, 0.1 to 100 ppm, 0.2 to 50 ppm, 0.2 to 25 ppm, 0.3 to 10 ppm, 0.4 to 9 ppm, or particularly 0.5 to 8 ppm. Alternatively, the content of Nd in the crystallized glass may be 0 to 10 ppm.

Thus, a less tinted LAS-based crystallized glass having excellent transparency or whiteness can be easily obtained.

Alternatively, in the LAS-based crystallized glass according to the present invention, the content of Nd in the crystallized glass may be not less than 1 ppm, not less than 5 ppm, not less than 10 ppm, not less than 20 ppm, not less than 30 ppm, not less than 50 ppm, not less than 80 ppm, not less than 100 ppm, or not less than 160 ppm.

Thus, production costs and effort can be saved, which is favorable. In addition, the yellowish tint of the LAS-based crystallized glass can be reduced, which is favorable.

In the LAS-based crystallized glass according to the present invention, the content of each of V and Cr in the glass is 0 to 3 ppm and the content of each of Sc, La, Ce, Pr, Pm, Sm, Eu, Gd, Tb, Dy, Ho, Er, Tm, Yb, Lu, Ac, Th, Pa, and U is 0 to 10 ppm.

The LAS-based crystallized glass according to the present invention preferably contains 55 to 75% $SiO_2$, 5 to 25% $Al_2O_3$, 2 to 5% $Li_2O$, 0 to 1% $Na_2O$, 0 to 1% $K_2O$, 0 to 3% MgO, 0 to 2% BaO, 0.5 to 3% $TiO_2$, 0.1 to 5% $ZrO_2$, 3 to 5% $TiO_2+ZrO_2$, 0 to 3% $P_2O_5$, and 0 to 1% $SnO_2$.

Reasons why the content of each of the components of the LAS-based crystallized glass is defined as above will be described below.

$SiO_2$ is a component that forms part of a glass network and also constitutes part of a LAS-based crystal. The content of $SiO_2$ is preferably 55 to 75%, more preferably 58 to 72%, and particularly preferably 60 to 70%. If the content of $SiO_2$ is too small, the coefficient of thermal expansion tends to increase, so that a crystallized glass having excellent thermal shock resistance is less likely to be obtained. In addition, the chemical durability tends to decrease. On the other hand, if the content of $SiO_2$ is too large, the meltability of glass decreases and the viscosity of glass melt increases, so that the glass is difficult to clarify and difficult to form into shape, which decreases productivity. As a result, the production costs rise.

$Al_2O_3$ is a component that forms part of a glass network and also constitutes part of a LAS-based crystal. The content of $Al_2O_3$ is preferably 5 to 25%, more preferably 15 to 25%, still more preferably 18 to 25%, and particularly preferably 20 to 24%. If the content of $Al_2O_3$ is too small, the coefficient of thermal expansion tends to increase, so that a crystallized glass having excellent thermal shock resistance is less likely to be obtained. In addition, the chemical durability tends to decrease. On the other hand, if the content of $Al_2O_3$ is too large, the meltability of glass decreases and the viscosity of glass melt increases, so that the glass is difficult to clarify and difficult to form into shape, which decreases productivity. As a result, the production costs rise. Furthermore, mullite crystals tend to be precipitated to devitrify the glass and the glass becomes fragile.

$Li_2O$ is a constituent of a LAS-based crystal, and a component that largely influences the crystallinity and reduces the viscosity of glass to improve the meltability and formability of the glass. In addition, $Li_2O$ is a component the raw material cost of which is generally high. The content of $Li_2O$ is preferably 2 to 5% and particularly preferably 3 to 4.5%. If the content of $Li_2O$ is too small, mullite crystals tend to be precipitated to devitrify the glass. In addition, in crystallizing the glass, LAS-based crystals are less likely to be precipitated, so that a crystallized glass having excellent thermal shock resistance is difficult to obtain. Furthermore, the meltability of glass decreases and the viscosity of glass melt increases, so that the glass is difficult to clarify and difficult to form into shape, which decreases productivity. As a result, the production costs rise. On the other hand, if the content of $Li_2O$ is too large, the production costs of the glass rise.

$Na_2O$ is a component that can be dissolved in LAS-based crystals to form a solid solution, and a component that largely influences the crystallinity and reduces the viscosity of glass to improve the meltability and formability of the glass. The content of $Na_2O$ is preferably 0 to 1% and more preferably 0 to 0.8%. If the content of $Na_2O$ is too large, the coefficient of thermal expansion tends to increase, so that a crystallized glass having excellent thermal shock resistance is less likely to be obtained.

$K_2O$ is a component that can be dissolved in LAS-based crystals to form a solid solution, and a component that largely influences the crystallinity and reduces the viscosity of glass to improve the meltability and formability of the glass. The content of $K_2O$ is preferably 0 to 1% and particularly preferably 0 to 0.8%. If the content of $K_2O$ is too large, the coefficient of thermal expansion tends to increase, so that a crystallized glass having excellent thermal shock resistance is less likely to be obtained.

MgO is a component that can be dissolved in LAS-based crystals to form a solid solution and has the effect of increasing the coefficient of thermal expansion of the LAS-based crystals. The content of MgO is preferably 0 to 3%, more preferably 0.1 to 2%, and particularly preferably 0.3 to 1.5%. If the content of MgO is too large, the crystallinity tends to become excessively high to devitrify the glass and the glass becomes fragile.

BaO is a component that reduces the viscosity of glass to improve the meltability and formability of the glass. The content of BaO is preferably 0 to 2%, more preferably 0.5 to 1.8%, and particularly preferably 1 to 1.5%. If the content of BaO is too large, Ba-containing crystals are likely to precipitate, so that the glass is likely to devitrify. If the content of BaO is too small, the viscosity of glass melt increases, so that the glass is difficult to clarify and difficult to form into shape, which decreases productivity. As a result, the production costs rise.

$TiO_2$ is a component serving as a crystal nucleating agent for precipitating crystals in a crystallization step. The content of $TiO_2$ is preferably 0.5 to 3%, more preferably 1.0 to 2.7%, and particularly preferably 1.5 to 2.5%. If the content of $TiO_2$ is too large, tinting of the glass tends to be increased. On the other hand, if the content of $TiO_2$ is too small, crystal nuclei may not be formed well, so that coarse crystals may precipitate to make the glass cloudy and subject to breakage.

$ZrO_2$ is, like $TiO_2$, a nucleating component for precipitating crystals in a crystallization step. The content of $ZrO_2$ is preferably 0.1 to 5%, more preferably 0.5 to 3%, and particularly preferably 1 to 2.5%. If the content of $ZrO_2$ is too large, the glass is likely to devitrify when melted, so that the glass is difficult to form into shape, which decreases productivity. As a result, the production costs rise. On the other hand, if the content of $ZrO_2$ is too small, crystal nuclei may not be formed well, so that coarse crystals may precipitate to make the glass cloudy and subject to breakage.

The total content of $TiO_2+ZrO_2$ is preferably 3 to 5%, more preferably 3.5 to 4.7%, and particularly preferably 4 to 4.5%. If the total content of $TiO_2+ZrO_2$ is too large, the glass is likely to devitrify when melted, so that the glass is difficult to form into shape, which decreases productivity. As a result, the production costs rise. On the other hand, if the total content of $TiO_2+ZrO_2$ is too small, crystal nuclei may not be formed well, so that coarse crystals may precipitate to make the glass cloudy and subject to breakage.

$P_2O_5$ is a component that suppresses precipitation of coarse $ZrO_2$ crystals. The content of $P_2O_5$ is preferably 0 to 3%, more preferably 0 to 2.5%, and particularly preferably 0 to 2%. If the content of $P_2O_5$ is too large, the amount of LAS-based crystals precipitated becomes small, so that the coefficient of thermal expansion tends to increase. If the content of $P_2O_5$ is too small, coarse $ZrO_2$ crystals precipitate to make the glass likely to be cloudy.

SnO$_2$ is a component acting as a fining agent. On the other hand, SnO$_2$ is also a component that, if it is contained much, significantly increases tinting of the glass. In addition, SnO$_2$ is also a component the raw material cost of which is generally high. The content of SnO$_2$ is preferably 0 to 1%, more preferably 0.01 to 0.5%, and particularly preferably 0.1 to 0.4%. If the content of SnO$_2$ is too large, the tinting of the glass is increased. If the content of SnO$_2$ is too small, the glass is difficult to clarify, which decreases productivity. In addition, the production costs of the glass rise.

The LAS-based crystallized glass according to the present invention may contain, in addition to the above components, minor components, including H$_2$, CO$_2$, CO, H$_2$O, Ne, Ne, Ar, and N$_2$, each up to 0.1%. Furthermore, precious metal elements, including Ag, Au, Pd, and Ir, may be added, each up to 10 ppm, into the crystallized glass.

Moreover, without having any adverse effect in terms of tinting, the LAS-based crystallized glass according to the present invention may contain Pt, Rh, B$_2$O$_3$, CaO, SrO, SO$_3$, MnO, Cl$_2$, and/or WO$_3$ up to 2% in total.

In a LAS-based crystallizable glass according to the present invention, the content of each of V and Cr in the glass is 0 to 3 ppm and the content of each of Sc, La, Ce, Pr, Pm, Sm, Eu, Gd, Tb, Dy, Ho, Er, Tm, Yb, Lu, Ac, Th, Pa, and U is 0 to 10 ppm.

Note that the compositional features of the crystallized glass according to the present invention are common to those of the crystallizable glass according to the present invention. Therefore, a detailed description of the crystallizable glass will not be given below.

Hereinafter, a description will be given of characteristics of the LAS-based crystallizable glass and LAS-based crystallized glass according to the present invention.

In the LAS-based crystallizable glass according to the present invention, the color tone of transmitted light through a thickness of 3 mm of the glass is, in terms of b* value in a L*a*b* representation in the CIE standard, preferably less than 1.12, 1.11 or less, or 1.10 or less. If the b* value is too high, the yellowish tint of the glass becomes excessive.

In the LAS-based crystallized glass according to the present invention, the color tone of transmitted light through a thickness of 3 mm of the glass is, in terms of b* value in a L*a*b* representation in the CIE standard, preferably 2.86 or less, 2.8 or less, 2.7 or less, 2.6 or less, 2.5 or less, less than 2.5, 2.45, less than 2.41, 2.4 or less, or 2.3 or less, and more preferably 2.2 or less. If the b* value is too high, the yellowish tint of the glass becomes excessive.

In the LAS-based crystallized glass according to the present invention, a β-quartz solid solution is preferably precipitated as a main crystal phase. When a β-quartz solid solution is precipitated as a main crystal phase, the crystallized glass easily transmits visible light and the transparency is easily increased. In addition, the expansion of the glass can be easily approximated to zero.

In the LAS-based crystallized glass according to the present invention in which a β-quartz solid solution is precipitated as a main crystal phase, the coefficient of thermal expansion at 30 to 380° C. is preferably $-20\times10^{-7}$/° C. to $20\times10^{-7}$/° C., $-15\times10^{-7}$/° C. to $15\times10^{-7}$/° C., $-10\times10^{-7}$/° C. to $10\times10^{-7}$/° C., or $-5\times10^{-7}$/° C. to $5\times10^{-7}$/° C., and more preferably $-2.5\times10^{-7}$/° C. to $2.5\times10^{-7}$/° C. If the coefficient of thermal expansion at 30 to 380° C. is too high or too low, the product decreases thermal shock resistance, so that it is easily broken by temperature change. The adjustment of the coefficient of thermal expansion can be achieved by adjusting the contents of the components, including SiO$_2$, Al$_2$O$_3$, Li$_2$O, Na$_2$O, K$_2$O, MgO, TiO$_2$, and ZrO$_2$, within the above respective ranges and crystallizing the crystallizable glass within the temperature range and time range to be described hereinafter.

Furthermore, in the LAS-based crystallized glass according to the present invention, a β-spodumene solid solution may be precipitated. The β-spodumene solid solution can be easily precipitated by subjecting a 0-quartz solid solution to heat treatment. When the β-spodumene solid solution is precipitated, a crystallized glass having a high degree of whiteness (i.e., a white crystallized glass) can be easily obtained.

In the case of precipitating of a β-spodumene solid solution, the color tone of transmitted light through a thickness of 3 mm of the LAS-based crystallized glass according to the present invention is, in terms of b* value in a L*a*b* representation in the CIE standard, preferably less than 40.85, 40.7 or less, 40.5 or less, or 40.1 or less. If the b* value is too high, the yellowish tint of the glass becomes excessive.

In the LAS-based crystallized glass according to the present invention in which β-spodumene is precipitated as a main crystal phase, the coefficient of thermal expansion at 30 to 380° C. is preferably $-20\times10^{-7}$/° C. to $20\times10^{-7}$/° C., $-15\times10^{-7}$/° C. to $15\times10^{-7}$/° C., $-10\times10^{-7}$/° C. to $10\times10^{-7}$/° C., or $0\times10^{-7}$/° C. to $20\times10^{-7}$/° C., and more preferably $0\times10^{-7}$/° C. to $15\times10^{-7}$/° C. If the coefficient of thermal expansion at 30 to 380° C. is too high, the product decreases thermal shock resistance, so that it is easily broken by temperature change. The adjustment of the coefficient of thermal expansion can be achieved by adjusting the contents of the components, including SiO$_2$, Al$_2$O$_3$, Li$_2$O, Na$_2$O, K$_2$O, MgO, TiO$_2$, and ZrO$_2$, within the above respective ranges and crystallizing the crystallizable glass within the temperature range and time range to be described hereinafter.

Next, a description will be given below of a method for producing a LAS-based crystallized glass according to the present invention.

A method for producing a LAS-based crystallizable glass according to the present invention is a method for producing a LAS-based crystallizable glass, including the steps of preparing a batch of raw materials, melting the batch, and forming the melt batch into shape, wherein selection of the raw materials and management of the steps are made so that the content of each of V and Cr in the obtained crystallizable glass is 0 to 3 ppm and the content of each of Sc, La, Ce, Pr, Pm, Sm, Eu, Gd, Tb, Dy, Ho, Er, Tm, Yb, Lu, Ac, Th, Pa, and U in the obtained crystallizable glass is 0 to 10 ppm.

Furthermore, the method for producing a LAS-based crystallizable glass according to the present invention is a method for producing a LAS-based crystallizable glass, including the steps of preparing a batch of raw materials, melting the batch, and forming the melt batch into shape, wherein selection of the raw materials and management of the steps are preferably made so that the content of each of V and Cr in the obtained crystallizable glass is 0 to 3 ppm and the content of each of Sc, Y, La, Ce, Pr, Nd, Pm, Sm, Eu, Gd, Tb, Dy, Ho, Er, Tm, Yb, Lu, Ac, Th, Pa, and U in the obtained crystallizable glass is 0 to 10 ppm.

In the method for producing a LAS-based crystallized glass according to the present invention, the above crystallizable glass is subjected to heat treatment to crystallize it.

As just described, in the method for producing a LAS-based crystallized glass according to the present invention, the selection of raw materials and the management of the steps are made by focusing on V, Cr, the rare earth elements, and the actinoid elements. These elements are incorporated into the glass in the course of production and can have an effect, even in a slight amount, on the tinting of the glass. For example, if any element capable of contributing to tinting is contained in glass raw materials used, it will be incorporated into the glass through melting and shape forming. Furthermore, also when cullet used to increase the melting efficiency contains any of V, Cr, the rare earth elements, and the actinoid elements, these elements will be incorporated into the glass. In addition, also when a member of a melting furnace melts out at high temperatures during melting of the glass, these elements may be incorporated into the glass. These kinds of tinting should preferably be suppressed by selecting raw materials and cullet for use and decreasing the melting temperature.

Since, among the rare earth elements, Y and Nd are components less likely to degrade the color tone than the other elements as previously described, it is not necessary to reduce the contents of them in the glass to the limit. Alternatively, these elements may be positively incorporated to a certain extent. Since the preferred content of each of these elements is as previously described, further description thereof will not be given here.

First, raw materials for use are selected as described previously and the glass raw materials are formulated to give a desired composition, thus preparing a batch of raw materials.

In the method for producing a LAS-based crystallized glass according to the present invention, a Zr raw material is preferably used in which the content of each of V, Cr, the rare earth elements, and the actinoid elements is 0 to 500 ppm or a Zr raw material is preferably used in which the content of each of these elements is 0 to not more than 500 ppm, 0 to 350 ppm, 0 to 250 ppm, 0 to not more than 150 ppm, 0 to 100 ppm or particularly 0 to 50 ppm.

Examples of the Zr raw material include $ZrSiO_4$ (zircon or zircon flour) and $ZrO_2$ (zirconium oxide) and, above all, $ZrO_2$ (zirconium oxide) is preferably used. Furthermore, $ZrO_2$ refined by a wet process is preferred and $ZrO_2$ washed with a wash solution (for example, carboxylic acid solution, ammonia solution or ammonium carboxylate solution) is particularly preferred because the content of impurities in $ZrO_2$ can be further reduced.

Other than the Zr raw material, a P raw material, a Ti raw material, and so on may also contain any of the rare earth elements and actinoid elements. Therefore, it is preferred that suitable materials for these raw materials, like the Zr raw material, should also be selected. For example, a P raw material and/or a Ti raw material is preferably used in which the content of each of the rare earth elements and the actinoid elements is 0 to 500 ppm or a P raw material and/or a Ti raw material is preferably used in which the content of each of these elements is 0 to not more than 500 ppm, 0 to 350 ppm, 0 to 250 ppm, 0 to not more than 150 ppm, 0 to 100 ppm or particularly 0 to 50 ppm. Thus, a LAS-based crystallized glass having more excellent transparency or whiteness can be obtained.

Furthermore, in using a mixture of a batch of raw materials and glass cullet, the selection of type of glass cullet for use and the rate of use of the glass cullet should preferably be determined in consideration of the contents of V, Cr, the rare earth elements, and the actinoid elements contained in the glass cullet.

Since the preferred glass composition is as previously described, further description thereof will not be given here.

Next, the batch of raw materials is injected into a glass melting furnace, melted at 1500 to 1750° C., and then formed into shape, thus obtaining a LAS-based crystallizable glass.

Thereafter, the obtained crystallizable glass is subjected to heat treatment to crystallize it. As crystallization conditions, nucleation is first performed at 700 to 800° C. (preferably 750 to 790° C.) for 5 to 300 minutes (preferably 60 to 180 minutes) and crystal growth is then performed at 800 to 950° C. (preferably 850 to 900° C.) for 5 to 120 minutes (preferably 10 to 60 minutes). By doing so, a transparent LAS-based crystallized glass having a β-quartz solid solution precipitated as a main crystal phase therein can be obtained.

Alternatively, when crystal growth is performed under the condition at 1050 to 1200° C. (preferably 1100 to 1150° C.) for 5 to 120 minutes (preferably 10 to 60 minutes), a white, opaque LAS-based crystallized glass having a β-spodumene solid solution precipitated as a main crystal phase therein can be obtained.

EXAMPLES

Hereinafter, the present invention will be described with reference to examples, but is not limited to the following examples. Table 1 shows Examples 1 to 6 of the present invention and Comparative Examples 1 to 3 in each of which a β-quartz solid solution is precipitated as a main crystal phase. The contents of basic components other than the components shown in Table 1 are as shown in Table 2.

TABLE 1

| ppm | UNIT | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|
| Sc | mass | <0.2 | <0.2 | <0.2 | <0.2 | <0.2 | <0.2 | <0.2 | <0.2 | <0.2 |
| Y | | 0.4 | 0.4 | 50.4 | 95.4 | 0.4 | 0.4 | 42.0 | 240.0 | 240.0 |
| La | | 0.4 | 0.4 | 0.4 | 0.4 | 0.4 | 0.4 | 2.2 | 2.2 | 2.2 |
| Ce | | 0.4 | 0.4 | 0.4 | 0.4 | 0.4 | 1.3 | 2.2 | 2.2 | 2.2 |
| Pr | | <0.2 | <0.2 | <0.2 | <0.2 | <0.2 | <0.2 | 0.2 | 0.2 | 0.2 |
| Nd | | <0.2 | <0.2 | <0.2 | <0.2 | <0.2 | 250.0 | 0.8 | 0.8 | 250.0 |
| Pm | | <0.2 | <0.2 | <0.2 | <0.2 | <0.2 | <0.2 | <0.2 | <0.2 | <0.2 |
| Gd | | <0.2 | <0.2 | <0.2 | <0.2 | 1.0 | 1.4 | 1.4 | 1.4 | 1.4 |
| Tb | | <0.2 | <0.2 | <0.2 | <0.2 | 0.2 | 0.2 | 0.4 | 0.4 | 0.4 |
| Sm | | <0.2 | <0.2 | <0.2 | <0.2 | 0.3 | 0.3 | 0.5 | 0.5 | 0.5 |
| Eu | | <0.2 | <0.2 | <0.2 | <0.2 | 0.3 | 0.3 | 0.4 | 0.4 | 0.4 |
| Dy | | <0.2 | <0.2 | <0.2 | <0.2 | 5.2 | 5.2 | 4.2 | 4.2 | 4.2 |
| Ho | | <0.2 | <0.2 | <0.2 | <0.2 | 0.8 | 0.8 | 1.4 | 1.4 | 1.4 |
| Er | | <0.2 | <0.2 | <0.2 | <0.2 | 7.0 | 7.0 | 6.0 | 6.0 | 6.0 |
| Tm | | <0.2 | <0.2 | <0.2 | <0.2 | 0.4 | 0.4 | 1.2 | 1.2 | 1.2 |
| Yb | | <0.2 | <0.2 | <0.2 | <0.2 | 9.5 | 9.5 | 11.0 | 11.0 | 11.0 |
| Lu | | <0.2 | <0.2 | <0.2 | <0.2 | 2.2 | 2.2 | 2.2 | 2.2 | 2.2 |
| Ac | | <0.2 | <0.2 | <0.2 | <0.2 | <0.2 | <0.2 | <0.2 | <0.2 | <0.2 |

TABLE 1-continued

| ppm | UNIT | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|
| Th | | 0.2 | 0.2 | 0.2 | 0.2 | 5.0 | 5.0 | 5.9 | 5.9 | 5.9 |
| Pa | | <0.2 | <0.2 | <0.2 | <0.2 | <0.2 | <0.2 | <0.2 | <0.2 | <0.2 |
| U | | 0.2 | 0.2 | 0.2 | 0.2 | 7.0 | 7.0 | 11.0 | 11.0 | 11.0 |
| V | | 0.9 | 1.4 | 1.4 | 1.4 | 1.4 | 1.4 | 1.4 | 1.4 | 1.4 |
| Cr | | 0.5 | 0.6 | 0.6 | 0.6 | 0.6 | 0.6 | 0.6 | 0.6 | 0.6 |
| Uncrystallized Glass | | | | | | | | | | |
| L* (thickness 3 mm) | — | 96.4 | 96.3 | 96.4 | 96.3 | 96.3 | — | 96.3 | 96.1 | — |
| a* (thickness 3 mm) | | −0.32 | −0.32 | −0.29 | −0.30 | −0.32 | — | −0.32 | −0.33 | — |
| b* (thickness 3 mm) | | 1.06 | 1.06 | 1.02 | 1.07 | 1.09 | — | 1.12 | 1.13 | — |
| CTE (30~380° C.) | ×10 − 7/° C. | 42 | 42 | 42 | 42 | 42 | 42 | 43 | 43 | 41 |
| Crystallized Glass (Main Crystal Phase: β-Quartz Solid Solution) | | | | | | | | | | |
| L* (thickness 3 mm) | — | 95.4 | 95.3 | 95.7 | 95.5 | 95.2 | 94.8 | 95.3 | 94.9 | 94.5 |
| a* (thickness 3 mm) | | −0.36 | −0.35 | −0.35 | −0.35 | −0.36 | −0.34 | −0.31 | −0.37 | −0.37 |
| b* (thickness 3 mm) | | 2.17 | 2.41 | 2.07 | 2.20 | 2.85 | 2.65 | 2.87 | 3.07 | 2.88 |
| CTE (30~380° C.) | ×10 − 7/° C. | 0 | 0 | 0 | −1 | −1 | 0 | 0 | 1 | 0 |
| Crystallized Glass (Main Crystal Phase: β-Spodumene Solid Solution) | | | | | | | | | | |
| L* (thickness 3 mm) | — | 28.5 | — | 28.2 | — | 27.7 | — | 27.1 | 26.5 | — |
| a* (thickness 3 mm) | | 13.90 | — | 13.98 | — | 14.10 | — | 14.26 | 14.47 | — |
| b* (thickness 3 mm) | | 39.80 | — | 39.95 | — | 40.48 | — | 40.85 | 40.95 | — |
| CTE (30~380° C.) | ×10 − 7/° C. | 11 | 10 | 12 | 12 | 11 | 12 | 13 | 12 | 11 |

TABLE 2

| | mass % |
|---|---|
| SiO$_2$ | 65.7 |
| Al$_2$O$_3$ | 22.2 |
| MgO | 0.7 |
| BaO | 1.2 |
| Li$_2$O | 3.7 |
| Na$_2$O | 0.4 |
| K$_2$O | 0.3 |
| ZrO$_2$ | 2.2 |
| TiO$_2$ | 2.0 |
| P$_2$O$_5$ | 1.4 |
| Fe$_2$O$_3$ | 0.012 |
| SnO$_2$ | 0.3 |

First, raw materials were formulated in the form of an oxide, a hydroxide, a carbonate, a nitrate or other forms so that each of glasses having respective compositions shown in Tables 1 and 2 was obtained, thus obtaining a glass batch. The obtained glass batch was put into a quartz-made crucible, melted therein at 1600° C. for 23 hours, and then melted at 1650° C. for an hour. After the melting, the molten glass was formed with a thickness of 5 mm by roll forming and cooled to room temperature using a slow-cooling furnace, thus obtaining a crystallizable glass plate. The Zr raw material used in Examples 1 to 4 was ZrO$_2$, the Zr raw material used in Examples 5 to 6 was a mixture material of ZrO$_2$ and zircon flour, and the Zr raw material used in Comparative Examples 1 to 3 was zircon.

The crystallizable glass was subjected to heat treatment at 760 to 780° C. for 180 minutes to form crystal nuclei and then further subjected to heat treatment at 870 to 890° C. for 60 minutes to crystallize it. The obtained crystallized glass plate was measured in terms of chromaticity.

The chromaticity of transmitted light was evaluated by measuring the crystallized glass plate optically polished to a thickness of 3 mm from both sides in terms of transmittance at a wavelength of 380 to 780 nm with a spectro-photometer and calculating the L*, a*, and b* values in the CIE standard from the transmittance. A spectro-photometer V-670 manufactured by JASCO Corporation was used for the measurement.

The coefficient of thermal expansion was evaluated, using a crystallized glass sample processed with a length of 20 mm and a diameter of 3.8 mm, from its average coefficient of linear thermal expansion measured in a temperature range of 30 to 380° C. A dilatometer manufactured by NETZSCH was used for the measurement.

As is obvious from Table 1, since in Example 1 the contents of V, Cr, the rare earth elements, and the actinoid elements were small, both the crystallizable glass and the crystallized glass had lower b* values than in Comparative Example 1 and L* values equivalent to or higher than those in Comparative Example 1. Since in Example 2 the contents of V and Cr were equal to those in Comparative Example 1, both the crystallizable glass and the crystallized glass had equivalent L* values to those in Comparative Example 1. However, since in Example 2 the contents of the rare earth elements and the actinoid elements were small, the b* value in Example 2 was lower than that in Comparative Example 1.

In Examples 3 and 4, among the rare earth elements, the contents of Y were larger than those in Examples 1 and 2, but the b* values and L* values did not have advantageous differences from those in Examples 1 and 2. It can be seen from this that Y is less likely to degrade the color tones of the crystallizable glass and the crystallized glass. In Example 6, among the rare earth elements, the content of Nd was larger than those in Examples 1 to 5, but the b* value and L* value of the crystallized glass did not largely degrade.

INDUSTRIAL APPLICABILITY

The LAS-based crystallized glass according to the present invention is suitable for front windows of oil stoves, wood stoves and the like, substrates for high-technology products, such as color filter substrates and image sensor substrates, industrial scales, setters for firing electronic components, electromagnetic cooker top plates, fire door windows, and so on.

The invention claimed is:

1. A LAS-based crystallizable glass wherein
a content of each of V and Cr in the glass is 0 to 3 ppm,
a content of each of Sc, La, Ce, Pr, Pm, Sm, Eu, Gd, Tb, Dy, Ho, Er, Tm, Yb, Lu, Ac, Th, Pa, and U is 0 to 10 ppm,
a content of Y in the glass is 0.05 to 200 ppm, and
a content of a glass composition, in terms of % by mass, includes 55 to 72% $SiO_2$.

2. A LAS-based crystallized glass wherein
a content of each of V and Cr in the glass is 0 to 3 ppm,
a content of each of Sc, La, Ce, Pr, Pm, Sm, Eu, Gd, Tb, Dy, Ho, Er, Tm, Yb, Lu, Ac, Th, Pa, and U is 0 to 10 ppm,
a content of Y in the glass is 0.05 to 200 ppm, and
a content of a glass composition, in terms of % by mass, includes 55 to 72% $SiO_2$.

3. The LAS-based crystallized glass according to claim 2, containing as a glass composition, in terms of % by mass, 55 to 72% $SiO_2$, 5 to 25% $Al_2O_3$, 2 to 5% $Li_2O$, 0 to 1% $Na_2O$, 0 to 1% $K_2O$, 0 to 3% MgO, 0 to 2% BaO, 0.5 to 3% $TiO_2$, 0.1 to 5% $ZrO_2$, 3 to 5% $TiO_2+ZrO_2$, 0 to 3% $P_2O_5$, and 0 to 1% $SnO_2$.

4. The LAS-based crystallized glass according to claim 2, wherein a color tone of transmitted light through a thickness of 3 mm of the LAS-based crystallized glass has a b* value of 2.86 or less in a L*a*b* color system of a CIE standard.

5. The LAS-based crystallized glass according to claim 2, wherein a β-quartz solid solution is precipitated as a main crystal phase.

6. The LAS-based crystallized glass according to claim 2, wherein a β-spodumene solid solution is precipitated as a main crystal phase.

7. The LAS-based crystallized glass according to claim 2, wherein a coefficient of thermal expansion at 30 to 380° C. is $-20\times10^{-7}/°$ C. to $20\times10^{-7}/°$ C.

8. A method for producing a LAS-based crystallizable glass including the steps of
preparing a batch of raw materials, melting the batch, and forming the melt batch into shape, wherein
selection of the raw materials and management of the steps are made so that a content of each of V and Cr in the obtained crystallizable glass is 0 to 3 ppm, a content of each of Sc, La, Ce, Pr, Pm, Sm, Eu, Gd, Tb, Dy, Ho, Er, Tm, Yb, Lu, Ac, Th, Pa, and U in the obtained crystallizable glass is 0 to 10 ppm, a content of Y in the glass is 0.05 to 200 ppm, and a content of a glass composition, in terms of % by mass, includes 55 to 72% $SiO_2$.

9. A method for producing a LAS-based crystallized glass including the steps of
preparing a batch of raw materials, melting the batch, forming the melt batch into shape to produce a LAS-based crystallizable glass, and then subjecting the LAS-based crystallizable glass to heat treatment to crystallize the LAS-based crystallizable glass, wherein
selection of the raw materials and management of the steps are made so that a content of each of V and Cr in the obtained crystallized glass is 0 to 3 ppm, a content of each of Sc, La, Ce, Pr, Pm, Sm, Eu, Gd, Tb, Dy, Ho, Er, Tm, Yb, Lu, Ac, Th, Pa, and U in the obtained crystallized glass is 0 to 10 ppm, a content of Y in the glass is 0.05 to 200 ppm, and a content of a glass composition, in terms of % by mass, includes 55 to 72% $SiO_2$.

10. The method for producing a LAS-based crystallized glass according to claim 9, wherein the batch of raw materials is prepared to provide a crystallizable glass containing as a glass composition, in terms of % by mass, 55 to 72% $SiO_2$, 5 to 25% $Al_2O_3$, 2 to 5% $Li_2O$, 0 to 1% $Na_2O$, 0 to 1% $K_2O$, 0 to 3% MgO, 0 to 2% BaO, 0.5 to 3% $TiO_2$, 0.1 to 5% $ZrO_2$, 3 to 5% $TiO_2+ZrO_2$, 0 to 3% $P_2O_5$, and 0 to 1% $SnO_2$.

11. The method for producing a LAS-based crystallized glass according to claim 9, wherein a color tone of transmitted light through a thickness of 3 mm of the obtained LAS-based crystallized glass has a b* value of 2.86 or less in a L*a*b* color system of a CIE standard.

12. The method for producing a LAS-based crystallized glass according to claim 9, the method using, as a glass raw material, a Zr raw material in which a content of each of V, Cr, Sc, La, Ce, Pr, Pm, Sm, Eu, Gd, Tb, Dy, Ho, Er, Tm, Yb, Lu, Ac, Th, Pa, and U is 500 ppm or less.

13. The method for producing a LAS-based crystallized glass according to claim 9, wherein $ZrO_2$ is used as a Zr raw material.

* * * * *